(12) United States Patent
Kuroda et al.

(10) Patent No.: US 6,358,180 B1
(45) Date of Patent: Mar. 19, 2002

(54) ENGINE CONTROL SYSTEM AND METHOD

(75) Inventors: Shigetaka Kuroda; Atsushi Izumiura; Kazutomo Sawamura; Hideyuki Oki; Kan Nakaune; Takashi Kiyomiya, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/637,209

(22) Filed: Aug. 14, 2000

(30) Foreign Application Priority Data

Aug. 16, 1999 (JP) ............................................ 11-230133

(51) Int. Cl.[7] .......................... B60K 41/20; B60K 41/28
(52) U.S. Cl. .............................. 477/4; 477/183; 477/203
(58) Field of Search ............................ 477/4, 183, 203

(56) References Cited

U.S. PATENT DOCUMENTS

| | | | | |
|---|---|---|---|---|
| 4,286,683 A | * | 9/1981 | Zeigner et al. ............ 180/54.1 |
| 4,500,794 A | * | 2/1985 | Hamano et al. .......... 290/38 C |
| 6,202,776 B1 | * | 3/2001 | Masberg et al. ........... 180/65.2 |
| 6,275,759 B1 | * | 8/2001 | Nakajima et al. .............. 701/54 |
| 6,296,592 B1 | * | 10/2001 | Eguchi et al. .................. 477/5 |

* cited by examiner

*Primary Examiner*—Sherry Estremsky
(74) *Attorney, Agent, or Firm*—Armstrong, Westerman, Hattori, McLeland & Naughton, LLP

(57) ABSTRACT

An engine control system and method is disclosed, which reduces driver's feeling of unease relating to the operation of driving a vehicle which is idle-controlled so as to reduce the exhaust gas discharge, thereby improving the driving operability. The method comprising the steps of detecting a switch of the driving mode of the vehicle from a first normal driving range to a second normal driving range different from the first normal driving range; detecting whether the engine is currently in a stopped state due to an automatic stop operation; detecting whether a brake for stopping the vehicle is currently being operated; and automatically starting the engine if it is determined that the engine is currently in a stopped state due to the automatic stop operation, and that the driving mode has been switched to the second normal driving range, and that the brake is not currently being operated.

4 Claims, 8 Drawing Sheets

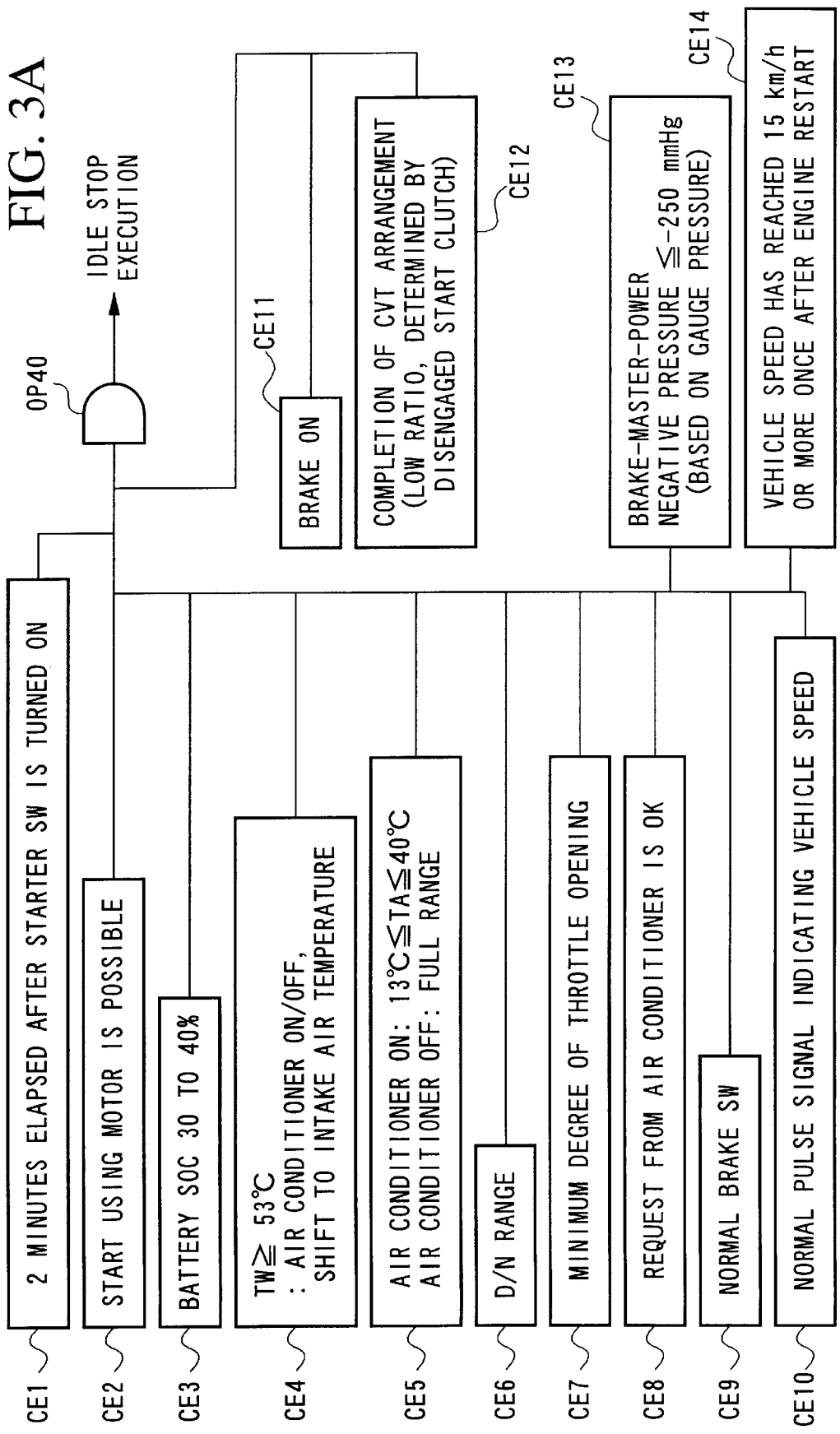

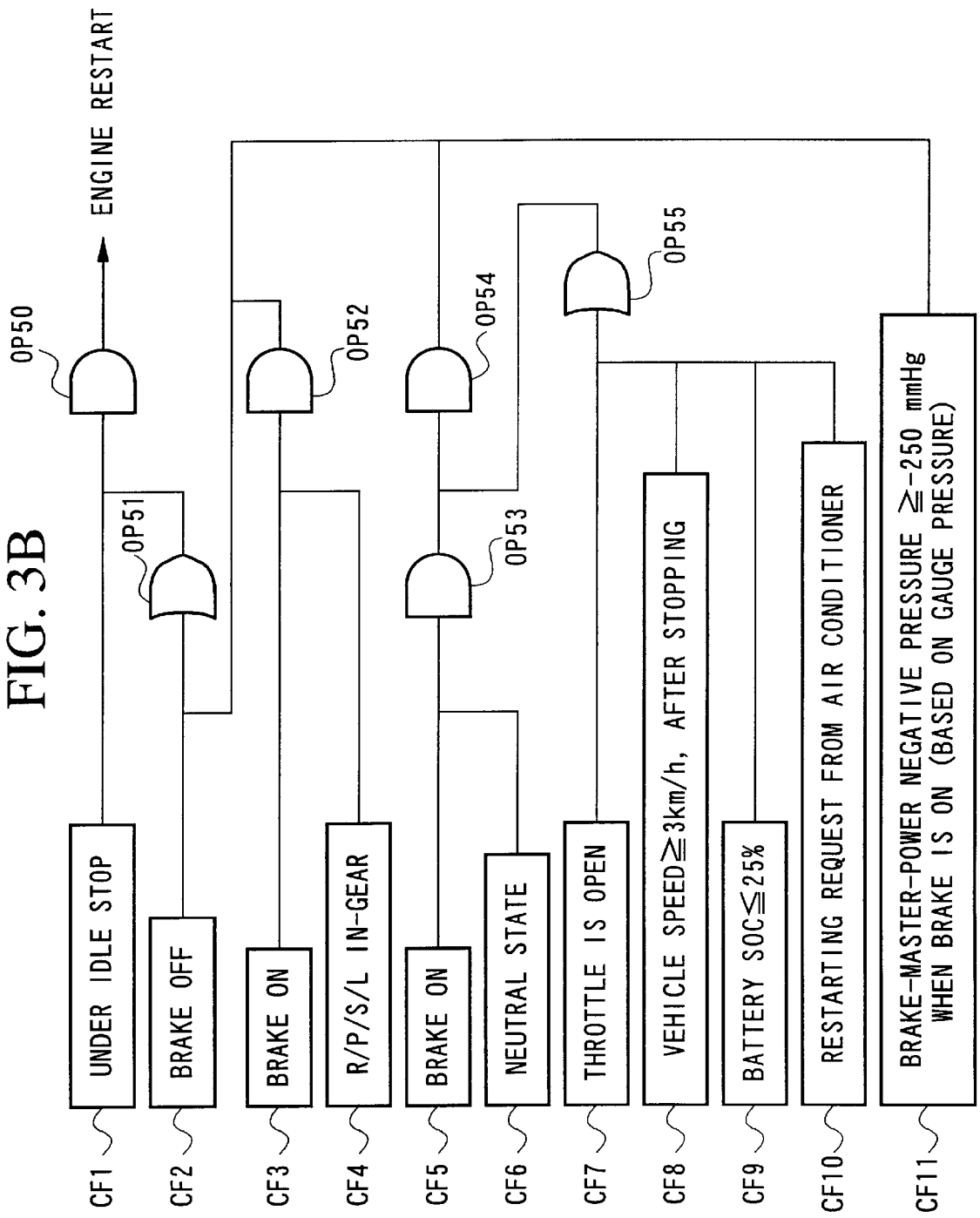

ENGINE CONTROL SYSTEM AND METHOD

BACKGROUND OF THE INVENTION

1. Field of the Invention

The present invention relates to an engine control system and method, in particular, to those for stopping the idling operation of the engine based on specific conditions, and restarting the engine based on other specific conditions.

2. Description of the Related Art

Recently, environmental problems such as global warming have become the focus of attention, and electric cars and hybrid vehicles have been actively developed so as to reduce the discharge of carbon dioxide and the like. Electric cars have no exhaust gas discharge; thus, they are most preferable in consideration of the environmental problems. However, the possible driving distance per single charge is short; thus, it is necessary to examine the practical possibility of vehicles employing an engine.

On the other hand, hybrid vehicles comprise an engine and an (electric) motor, where the battery is charged using the rotation of the engine. When the discharge of carbon dioxide or the like is relatively large and the engine (rotation) speed is low, it is possible to drive the vehicle by only using the motor or by using both the engine and motor, thereby decreasing the discharge of carbon dioxide. Recently, the hybrid vehicles have found practical use because the discharge of the carbon dioxide can be reduced and long-distance driving is possible while the characteristics specific to conventional vehicles (i.e., driving distance, operability, and the like) can be maintained.

Under such circumstances, a technique for automatically stopping the engine (that is, the engine is stopped, but not by an operation by the driver) has recently become the focus of attention, where the objective of this technique is to reduce the discharge of carbon dioxide by combustion of the fuel or to reduce fuel consumption, by stopping the engine during idling (i.e., an "idle stop" control). However, it is undesirable to attach too much importance to reduction of exhaust gas discharge at a considerable sacrifice to the operability of the vehicle. In particular, hybrid vehicles can have a long cruising range as described above, and can be expected to find widespread use in the future. Therefore, it is necessary to ensure an operability similar to that realized by currently used vehicles while reducing exhaust gas discharge. In an example hybrid vehicle employing a CVT (continuously variable transmission), a plurality of driving modes (for driving the vehicle) are provided.

The driving mode used for ordinary driving is called the D range (i.e., drive mode). Generally, conventional vehicles also have an S range (i.e., sport mode) in which (i) the set torque at the vehicle start is higher in comparison with the D range, so as to obtain faster acceleration, and (ii) the CVT ratio is set higher at a high-speed driving mode. This sport mode provides a feel of "sporty" driving.

In order to realize a comfortable driving operability, a hybrid car to be generally used should provide an S range as well as a D range, and in known hybrid vehicles, the range can be switched to the S range by an operation by the driver. This switching operation is conventionally carried out using a shift lever. However, in order to improve the operability for the driver, the provision of a set button in the vicinity of or on the steering wheel has been considered recently.

However, if the "S range" driving mode is set by using the above set button while the engine is automatically stopped, the driver may experience a feeling of unease. For example, if the driver pushes the set button for choosing the S range while the vehicle is stopped, then the engine is restarted. In this case, the driver (who selects the S range) may want to select the sport mode for the next time he or she drives, or the driver may want to immediately drive in the sport mode.

SUMMARY OF THE INVENTION

In consideration of the above circumstances, an objective of the present invention is to provide an engine control system and method for reducing a feeling of unease felt by the driver relating to the operation of driving a vehicle which is idle-controlled so as to reduce the exhaust gas discharge, thereby improving the driving operability.

Therefore, the present invention provides an engine control system for automatically stopping/starting an engine according to conditions of use of a vehicle, the system comprising an engine start/stop control device and an automatic transmission, wherein:

the automatic transmission, having driving modes of a first normal driving range and a second normal driving range different from the first normal driving range, comprises:

a driving mode switch detecting section for detecting a switch of the driving mode from the first normal driving range to the second normal driving range;

an automatic stop detecting section for detecting whether the engine is currently in a stopped state due to an automatic stop operation; and a brake state detecting section for detecting whether a brake for stopping the vehicle is currently being operated, and the engine start/stop control device comprises:

a control section for automatically starting the engine if it is determined by the automatic stop detecting section that the engine is currently in a stopped state due to the automatic stop operation, and if it is determined by the driving mode switch detecting section that the driving mode has been switched to the second normal driving range, and if it is determined by the brake state detecting section that the brake is not currently being operated.

The present invention also provides an engine control method for automatically stopping/starting an engine according to conditions of a vehicle, comprising the steps of:

detecting a switch of the driving mode of the vehicle from a first normal driving range to a second normal driving range different from the first normal driving range;

detecting whether the engine is currently in a stopped state due to an automatic stop operation;

detecting whether a brake for stopping the vehicle is currently being operated; and automatically starting the engine if it is determined that the engine is currently in a stopped state due to the automatic stop operation, and that the driving mode has been switched to the second normal driving range, and that the brake is not currently being operated.

In the above system and method, typically, the engine is automatically stopped during idling.

According to the present invention, while the engine is automatically stopped, if the driver switches the driving mode from the first normal driving range to the second normal driving range, then only if the brake is currently not being operated, the engine is restarted. Therefore, the engine is not restarted only as a result of the driver switching the driving mode, and the engine is restarted when the driver releases the brake pedal as in a normal driving operation. Accordingly, any feeling of unease which the driver may experience while driving is reduced, thereby improving the driving operability.

BRIEF DESCRIPTION OF THE DRAWINGS

FIGS. 3A and 3B are diagrams showing the conditions necessary for executing the idle stop (FIG. 3A), and the conditions necessary for executing the restart (FIG. 3B) in the embodiment shown in FIG. 2.

DESCRIPTION OF THE PREFERRED EMBODIMENTS

Hereinafter, the engine control system as an embodiment according to the present invention will be explained in detail with reference to the drawings.

Figure 1:
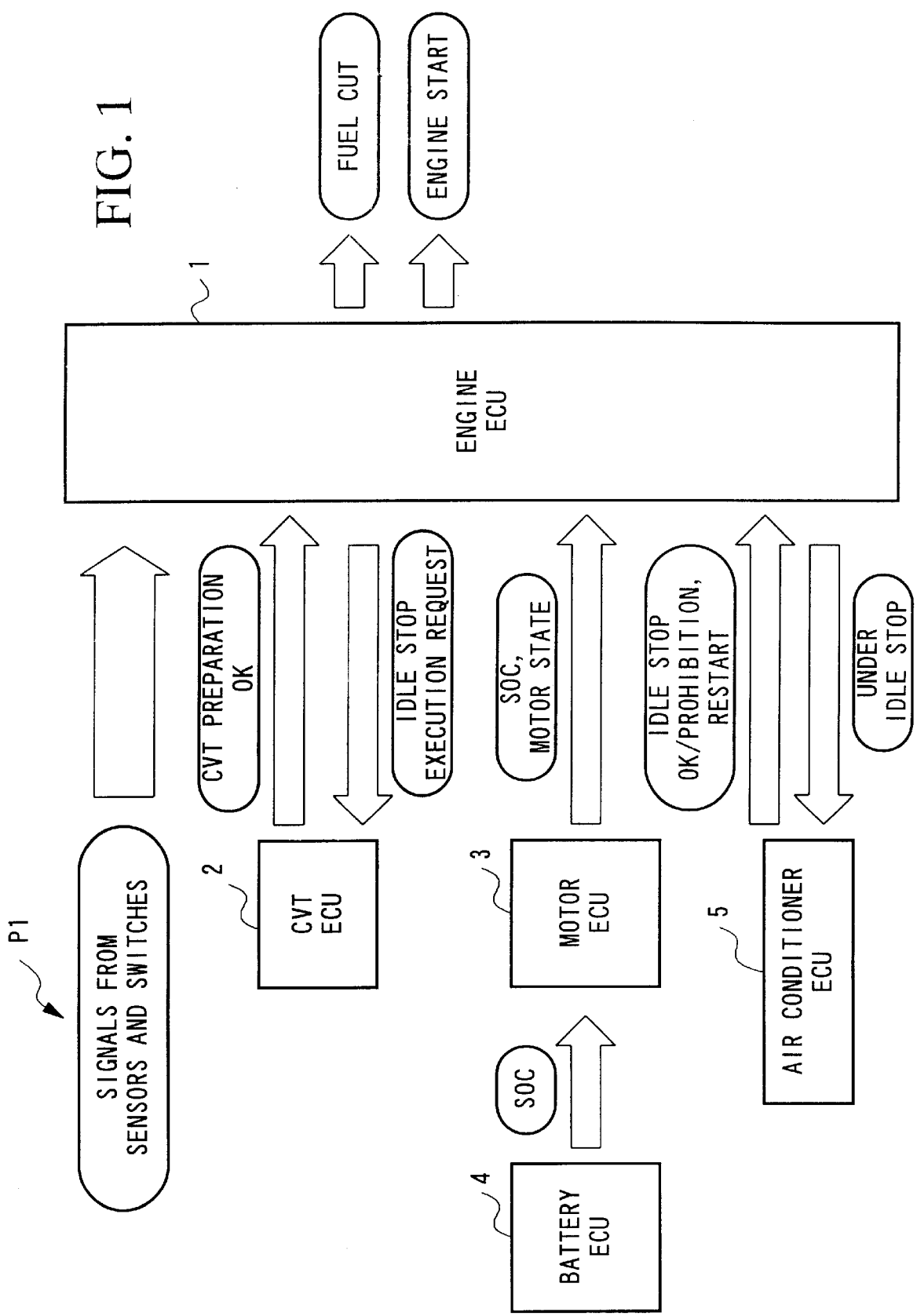
FIG. 1 is a block diagram showing the general structure of an embodiment of the engine control system according to the present invention.

FIG. 1 is a block diagram showing the general structure of the engine control system of the embodiment. In the embodiment, engine ECU (which functions as the engine control system) 1 controls the fuel supply to the engine (not shown) and the starting or stopping of the engine. The engine ECU 1 controls the engine based on signals output from various sensors and switches (see reference numeral P1).

The following are typical signals output from these sensors and switches: a signal indicating the vehicle speed, a signal showing the degree of depression of the accelerator pedal, a signal indicating the water temperature of the engine, a signal indicating engine intake-air temperature, a signal showing the ON/OFF state of the ignition switch, a signal showing whether the brake pedal has been depressed, a signal showing the shift position, a signal showing whether the clutch pedal has been depressed (if the vehicle comprises an MT (manual transmission)), and a signal showing brake-master-power negative pressure in case of employing a servo assisted brake.

In a vehicle having a CVT, the engine ECU outputs an idle stop request to CVT ECU 2, and controls the engine only when the CVT ECU 2 (which received the request) outputs a signal indicating that the preparation (or arrangement) for the idle stop is completed. Such a process is necessary due to the mechanics of the CVT (later explained in detail).

Here, the "idle stop" in the present specification basically means to stop the idling operation of the engine, and includes stopping the fuel supply in the deceleration mode based on specific conditions explained later.

In a hybrid vehicle having an (electric) motor, a battery ECU 4 for controlling the conditions of the battery (such as the state of charge, temperature, and the like) and a motor ECU 3 for controlling the conditions of the motor (such as the rotation speed) are provided. In this case, the engine ECU 1 controls the engine based on (i) a signal indicating the state of charge (indicating remaining battery charge), called SOC, output from the battery ECU 4, and (ii) a signal indicating the conditions of the motor (e.g., a signal indicating whether a starting operation using the motor is possible). The above conditions are detected and taken into consideration for the following reasons. In the hybrid vehicle (or the like), power is supplied from the battery to each relevant portion such as each ECU, the headlight, turn-signal lights (blinkers), and the like, even while the engine is automatically stopped in the idle stop mode; thus, if there is excessive power consumption, it may not be possible to restart the engine, or to drive using the motor after the starting operation.

In addition, vehicles usually have an air conditioner which uses the driving force. Therefore, in the vehicle in which there is idle stop control, the air conditioner cannot be used in the idle stop mode (i.e., under the idle stop). Therefore, if the outside air temperature is relatively high or low, it may be impossible to provide a comfortable driving environment by controlling the engine only based on the vehicle conditions such as the vehicle speed, engine speed, and the like. Therefore, in the present embodiment, the air conditioner ECU 5 for controlling the air conditioner is provided, and the engine is controlled according to the operational state defined by the driver.

Below, the engine control system as an embodiment according to the present invention will be explained in detail, with reference to the drawings.

Figure 2:
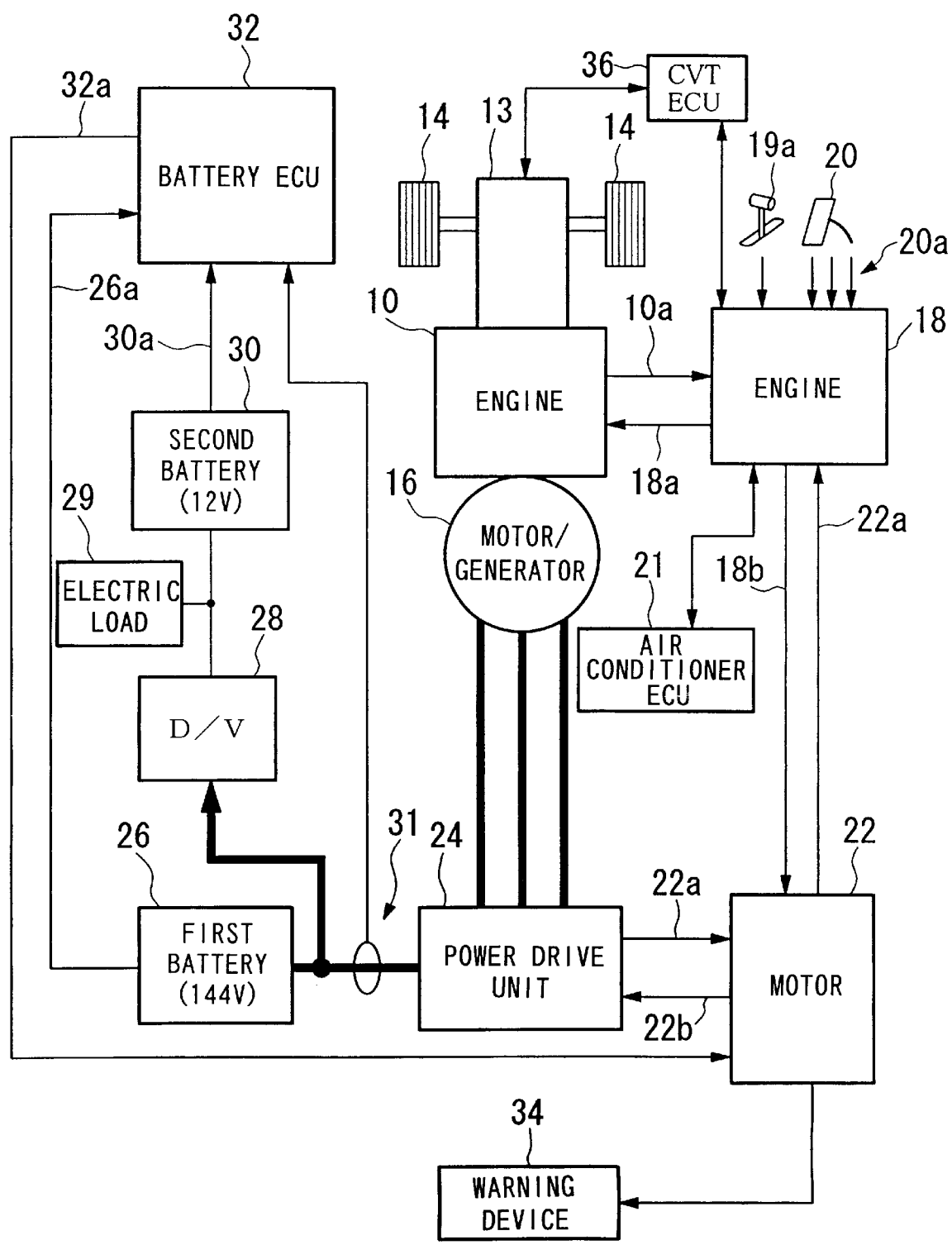
FIG. 2 is a block diagram showing the structure of an embodiment of the engine control system according to the present invention.

FIG. 2 is a block diagram showing the embodiment in which the present invention is applied to a hybrid vehicle comprising a CVT.

In FIG. 2, reference numeral 10 indicates an engine, the driving force of which is transmitted to wheels 14, 14 via CVT 13. In the wheels 14, 14, there is a pulse generator for generating a pulse for each rotation. The engine ECU 18 (which functions as the engine control system according to the present invention, and is explained later) calculates the vehicle speed according to the pulse interval. In addition, motor/generator 16 operated by three-phase alternating current is provided, where the motor/generator 16 is operated in parallel to the engine 10. Here, the rotation shaft of the motor/generator 16 and the rotation shaft of the engine 10 are directly coupled with each other. While the engine is stopped, the driving force of the motor/generator 16 is transmitted via CVT 13 to the wheels 14, 14, in contrast, while the engine 10 is driven, the motor/generator 16 is rotated by the engine 10 and functions as a generator.

Reference numeral 18 indicates an engine ECU, into which signals indicating engine (rotation) speed Ne, air intake passage pressure Pb, water temperature TW, intake air temperature, and the like are input, where these signals are output via signal line 10a from the engine 10. Simultaneously, a signal indicating whether a pedal 20 has been depressed is input via signal line 20a. According to the values indicated by these signals, the amount of the fuel supplied to the engine or the ignition timing are calculated, and a signal for controlling the fuel (supplied to the engine 10) and a signal for controlling the ignition timing are output via signal line 18a. A temperature sensor for measuring the intake air of the engine is positioned between an air cleaner (not shown) and engine 10. The pedal 20 is one of the accelerator pedal, clutch pedal, and brake pedal. In case of the accelerator pedal, a signal $\theta_{Th}$ indicating the angle of the depression is also output in addition to the above-explained signals.

In addition, reference numeral 19a indicates a shift lever which outputs a signal indicating the driving mode to the engine ECU 18. The driving mode such as the D range (i.e., the first normal driving range) or N range is determined by an operation by the driver. Reference numeral 21 indicates an air conditioner ECU which outputs to engine ECU a signal indicating permission/prohibition of the idle stop according to the driver's selection. In the present embodiment, the set button for selecting the S range (i.e., the second normal driving range) is not provided on the shift lever 19a, but is directly attached to the steering wheel (not shown), or provided in the vicinity of the steering wheel. Therefore, the driver can switch the driving mode to the S range only by pushing this set button.

The engine ECU 18 also controls the operation of the motor/generator 16. The engine ECU 18 is connected to motor ECU 22 via signal lines 18b and 22a. A control signal for designating the operation start or output power of motor/generator 16 is output from the engine ECU 18 via signal line 18b to the motor ECU 22. In addition, signals indicating the state of charge and output current of a first battery 26 are output from motor ECU 22 via signal line 22a to engine ECU 18. The output voltage of the first battery 26 is, for example, 144 V. The engine ECU 18 determines whether the engine control is carried out only by the driving force of the motor/generator 16 based on the state of charge of the first battery 26 and the output current of the first battery 26 (explained later). That is, when the state of charge of the first battery 26 is low, if the vehicle is driven only by using the driving force of the motor/generator 16, the vehicle may stop. Therefore, if the state of charge of the first battery 26 is low, the engine 10 is operated.

Reference numeral 24 indicates a power drive unit connected to the motor/generator 16. The power drive unit 24 converts the power supplied from the first battery 26 to a three-phase alternating current having a predetermined value, according to a control signal output from motor ECU 22 via signal line 22b, and outputs the three-phase alternating current to the motor/generator 16. The power drive unit 24 detects phase current and total current flowing through the motor/generator 16. The detected phase current and total current are output to the motor ECU 22 via signal line 24a. The motor ECU 22 calculates an indicated power value supplied to the motor/generator 16, in consideration of the phase current and total current (input via signal line 24a from power drive unit 24) so as to obtain the actual output power of the motor indicated by the control signal output from the engine ECU 18 via signal line 18b. The motor ECU 22 outputs a control signal indicating the calculated value via signal line 22b.

A current detector 31 for detecting current output from the first battery 26 is provided between the first battery 26 and power drive unit 24, and the detected value is output to battery ECU 32. The first battery 26 consists of 10 sub-batteries arranged in series. A voltage detector and temperature detector (neither is shown) are attached to each sub-battery, and the set of detected voltage and temperature of each are output via signal line 26a to the battery ECU 32.

In addition, downverter 28 is provided between the power drive unit 24 and the first battery 26. This downverter 28 converts the direct-current voltage output from the power drive unit 24 or the first battery 26 to, for example, 12 V, and outputs the converted voltage. To the downverter 28, a second battery 30 (output voltage thereof is, for example, 12 V) and electric load 29 are connected. This electric load 29 includes wipers, headlights, and control units such as engine ECU 18, motor ECU 22, and battery ECU 32. A voltage detector and current detector (neither is shown) are attached to the second battery 30, and the detected voltage and current values are output to battery ECU 32 via signal line 30a.

The battery ECU 32 monitors the status of batteries 26 and 30, such as the state of charge, temperature, and current value, and outputs the state of charge and output current of the first battery 26 and output current of the second battery 30 to motor ECU 22.

Reference numeral 34 indicates a warning device for warning the driver when the engine 10 is in the idle stop mode. This warning device is attached, for example, to the display panel in front of the driver's seat. A typical operation of the warning device 34 is that if the idle stop control is executed while the vehicle is stopped, then, a light or the like is turned on when the driver releases the clutch pedal, that is, when the clutch is completely engaged. The engine operation is restarted not only according to the driver's intention, but also when, for example, the state of charge of the first battery 26 indicates that the remaining charge is small. In this case, the engine is not restarted unless the clutch pedal is depressed; thus, the driver is requested to depress the clutch pedal so as to restart the engine. In addition, if a door is opened in the idle stop mode., the warning device 34 informs the driver that the vehicle is in the idle stop mode by using an alarm sound or a light.

Reference numeral 36 indicates a CVT ECU for controlling the CVT 13, and the CVT ECU 36 and engine ECU communicate with each other. More specifically, the engine ECU 18 outputs an idle stop execution request to the CVT ECU 36, and the CVT ECU 36 which receives the request monitors the state of CVT 13. When the preparation (or arrangement) for executing the idle stop is completed, the CVT ECU 36 outputs a signal indicating the completion of the CVT preparation to the engine ECU 18.

Below, the general operation of the vehicle comprising the engine control system of the present embodiment will be explained.

First, the case of driving the vehicle using the engine 10 will be explained.

When the driver depresses one of the pedals 20, a signal depending on which of the pedals 20 is depressed is output via signal line 20a. If the accelerator pedal is depressed, signal $\theta_{Th}$ indicating the angle of the depression is also input into engine ECU 18. When the engine ECU 18 receives the signal $\theta_{Th}$, the engine ECU 18 outputs a signal for controlling the amount of fuel supplied to the engine and a signal controlling the ignition timing to engine 10 via signal line 18a.

Based on these signals, in order to drive the engine 10, a specific amount of fuel is injected into the cylinders, and the ignition is carried out at specific timing. The driving force of engine 10 is transmitted via CVT 13 to wheels 14, 14, and the vehicle is driven. The signals indicating the engine speed, air intake passage pressure, and water pressure are output from engine 10 via signal line 10a, and the output signals are input into the engine ECU 18. Based on these signals and the above-explained signal $\theta_{Th}$ indicating the angle of depression of the accelerator pedal, the engine ECU 18 outputs a signal for controlling the engine 10 via signal line 18a.

As described above, the rotation shaft of the motor/generator 16 is directly coupled with the rotation shaft of the engine 10, so that the motor/generator 16 performs generation using the rotation of engine 10. The power generated by the motor/generator 16 is supplied via power drive unit 24 to the first battery 26, so that the first battery 26 is charged. In addition, the downverter 28 is connected to the power drive unit 24; thus, the second battery 30 is simultaneously charged when the first battery 26 is charged.

Furthermore, while the first battery 26 is charged, the current detector 31 detects the value of the current flowing from the power drive unit 24 to the first battery 26, and the detected current value is output via signal line 30a to battery ECU 32.

Next, the case of driving the vehicle using the driving force provided by motor/generator 16 will be explained.

When the driver depresses one of the pedals 20, a signal depending on which of pedals 20 is depressed is output via signal line 20a. If the accelerator pedal is depressed, signal $\theta_{Th}$ indicating the angle of depression is also input into engine ECU 18. When the engine ECU 18 receives the signal $\theta_{Th}$, the engine ECU 18 checks the state of charge of the first battery 26 input via signal line 22a, and outputs via signal line 18c a control signal according to the signal $\theta_{Th}$ indicating the angle of depression of accelerator pedal 20 if the state of charge is equal to or above a predetermined value.

According to the control signal input via the signal line 18b, the motor ECU 22 outputs a control signal via signal line 22b to the power drive unit 24. When the power drive unit 24 receives the control signal, the unit 24 converts the current of the power supplied from the first battery 26 to three-phase alternating current having a value corresponding to the input control signal, and supplies the converted current to the motor/generator 16. Accordingly, the motor/generator 16 rotates and the relevant driving force is transmitted via CVT 13 to wheels 14, 14, so that the driving of the vehicle is started.

When the motor/generator 16 starts rotation, the detected phase current and total current values are output from the power drive unit 24 to motor ECU 22. In order to actually obtain the output power of the motor which is indicated by the control signal output from engine ECU 18 via signal line 18b, the motor ECU 22 checks the above signals output from the power drive unit 24 and calculates the indicated power amount supplied to the motor/generator 16 based on these signals. The power drive unit 24 converts the power supplied from the first battery 26 to three-phase alternating current having a value corresponding to the control signal, and outputs the three-phase alternating current to the motor/generator 16.

In either case of driving using the engine 10 or using the motor/generator 16, the detected current output from the current detector 31, the detected voltage and temperature output from the first battery 26, and the detected current output from the second battery 30 are input into battery ECU 32. Based on the above detected values, the battery ECU 32 calculates the state of charge of the first battery 26, and outputs the calculated state of charge via signal line 32a to motor ECU 22. The state of charge of the first battery 26 received by the motor ECU 22 is then output to the engine ECU 18.

As shown in the above, general operations of the case of starting the driving only by using the engine 10 and the case of starting the driving only by using the motor/generator 16 have been explained. Here, the engine ECU 18 stops the idling operation of the engine (as explained above) if predetermined conditions are satisfied according to signals output from each sensor, switch, and controllers such as engine ECU 21, motor ECU 22, and battery ECU 32. The engine ECU 18 also starts the idling operation of the engine if predetermined conditions are satisfied.

Below, the control operations for stopping and starting the idling will be explained.

In the present embodiment, the idle stop/restart operation is performed in the following control cases, so as to reduce the exhaust gas discharge and improve the driving operability.

(1) Engine Stop in the Deceleration Mode

The engine 10 is stopped when the brake pedal is depressed and the CVT ECU 36 outputs a signal indicating the completion of CVT preparation. Here, if the driver suddenly brakes the vehicle, that is, if "panic braking" is performed, then the idle stop is not executed. The reason for this relates to a mechanical limitation of the CVT, due to which the ratio of the CVT 13 cannot be returned to a low ratio when "panic braking" is performed and thus the deceleration time is insufficient. Here, the idle stop is performed after the CVT ratio returns to a specific low ratio because otherwise, sufficient acceleration may not be obtained if the CVT ratio is not returned to the low ratio at the time of the vehicle start. In addition, restarting of the engine is performed when the driver releases the brake pedal.

(2) Idle Stop While the Vehicle is Stopped

If the brake pedal is depressed and the CVT ECU 36 outputs a signal indicating the completion of CVT preparation, the engine is stopped. The engine is restarted when the driver releases the brake pedal. The control in the present case (2) is performed to stop the engine when the conditions for executing the control (1) are not satisfied. That is, the present control operation is exclusive with respect to the above control operation (1). Therefore, for example, the following control is not performed here: after the engine is stopped according to the above control operation (1), the engine is started, and the engine is stopped again according to the control (2).

(3) Prohibition of Idle Stop After the Restart

When the brake pedal is depressed again after the driver has released it and the engine is restarted, (i) the idle stop is permitted if the re-depressing is being done for the first time in the current control, but (ii) if the re-depressing has been done twice or more, the idle stop is prohibited until the vehicle speed reaches a predetermined speed, for example, 15 km/h. Traffic congestion generally leads the driver to repeatedly (i) release the brake pedal so as to drive for a very short distance at a low speed and (ii) re-depress the brake pedal so as to stop the vehicle. If such an operation is repeated while the engine is stopped, the battery consumption rate is very high. Therefore, after the driver has released the brake pedal and the vehicle is started, if the brake pedal is re-depressed before the vehicle reaches a predetermined speed, then the idle stopping operation is carried out in principle. However, if the driver releases the brake pedal again and the vehicle is started, and the brake pedal is re-depressed again before the vehicle speed reaches a predetermined value, then the idle stopping operation is prohibited. In addition, when a vehicle comprising the CVT 13 is stopped, the inter-vehicle distance is adjusted by alternately depressing and releasing the brake pedal. In the idle stop mode, it may not be possible to adjust the inter-vehicle distance because of insufficient driving force. In order to prevent such a situation, the idle stop after the restarting operation should be prohibited so as to secure sufficient driving force.

The above is the basic control of the idle stop/restart. Below, more detailed controls performed in the present embodiment will be explained.

(4) Control for Preventing Sudden Start

This control is performed for preventing the vehicle from starting against the driver's intention in the idle stop mode when the conditions for releasing the idle stop state are satisfied. In the idle stop state, the conditions necessary for permitting the engine restart are that the accelerator pedal is depressed while the brake is depressed and the CVT 13 is in a neutral position, and the state of charge of batteries is decreased or the air conditioner outputs a request signal. That is, the conditions are not satisfied only by a neutral state of CVT 13. This is effective for preventing the vehicle start when a detector for detecting the neutral state is damaged for any reason and always outputs a signal indicating the neutral state.

(5) Notification of Idle Stop

In order to notify the driver of the idle stop mode, a warning device 34 (see FIG. 2) is provided, whereby a light or the like is turned on in the idle stop mode.

In a specific operation example of the warning device 34, a warning light (or the like) is turned on when the idle stop control is executed while the vehicle is stopped. The engine operation is restarted according not only to the driver's intention but also when, for example, the state of charge of the first battery 26 is decreased, as described in the above control operation (4).

(6) Warning Sound

In the idle stop mode, the driver may misunderstand the current state and think that the vehicle is completely stopped, and may try to leave the vehicle. In this case, if a door is open, the driver is informed of the idle stop mode by using warning sound or a light indicating the relevant state.

(7) Cooperation with the Air Conditioner

According to the state of operation of the air conditioner, it is determined whether the idle stop operation is performed. For example, when the temperature inside the vehicle's passenger compartment is high or low, the driver may intend to immediately increase or decrease the temperature. In this case, if the air conditioner cannot be operated because of the idle stop mode, the comfort of the passenger compartment may be degraded. Therefore, whether the idle stop operation is performed depends on the state of operation of the air conditioner.

(8) Control Based on the Result Detected By a Brake Master Power Negative-pressure Sensor Many vehicles are currently equipped with power assisted brakes. While the engine is stopped, if the driver continues to depress the brake pedal, the power available for generating the negative pressure of the assistor is reduced, so that the power necessary for the driver to depress the brake pedal becomes larger. In this case, the engine is started so as to secure necessary negative pressure.

(9) Improvement of Operational Comfort

After the ignition switch is turned on, the idle stop is prohibited for a predetermined time, for example, 2 minutes (case 1). In addition, in the reverse in-gear state, the idle stop is prohibited (case 2).

The reason for prohibiting idle stop in case 1 is as follows. If the vehicle is stopped in a parking lot for approximately one hour, the engine will still be warm and the idle stop can be performed. However, in parking lots, vehicles often drive slowly; thus, repeating the idle stop/restart operation would degrade the operational comfort.

The reason for prohibiting idle stop in case 2 is as follows. If the vehicle is put into a garage, the vehicle is alternately and repeatedly moved forwards and backwards. In this case, the operational comfort would be degraded if the idle stop were carried out every time the vehicle is moved forwards or backwards.

FIGS. 3A and 3B are diagrams showing the conditions necessary for executing the idle stop (see FIG. 3A), and the conditions necessary for executing the restart (see FIG. 3B).

As shown in FIG. 3A, conditions CE1 to CE14 are logically connected via AND operator OP40, that is, the idle stop is carried out when all conditions CE1 to CE14 are satisfied.

The condition CE1 is provided for indicating that a predetermined time (e.g., 2 minutes) has elapsed after a starter switch is turned on. This condition is checked for performing the above-explained control (9).

The condition CE2 is provided for indicating whether the vehicle can be started only by the motor/generator 16. Generally, when the engine is restarted in the hybrid vehicle, only motor/generator 16 is used so as to reduce the exhaust gas discharge. Therefore, this condition CE2 is a premise for performing the idle stop.

The condition CE3 is provided for indicating whether the state of charge of the first battery 26 is within a predetermined range (e.g., 30 to 40%). Similar to the above condition CE2, this condition CE3 is a premise for performing the idle stop because when the engine is restarted after an idle stop in a hybrid vehicle, only motor/generator 16 is generally used so as to reduce the exhaust gas discharge.

The conditions CE4 and CE5 are provided for permitting the idle stop if the outside air temperature TA and water temperature TW have predetermined values according to whether the air conditioner is operated.

When the air conditioner is in operation, the desired temperature in the vicinity of the driver's seat is determined by the driver. Therefore, if the idle stop is executed without regard for the state of operation of the air conditioner, the comfort of the passenger compartment may be degraded. This is why the condition CE5 is provided.

In addition, when the idle stop is performed, the high-temperature exhaust gas is not discharged from the engine and the temperature of the catalyzer itself is decreased, thereby increasing the amount of harmful exhaust gases. The above condition CE4 is provided for preventing the temperature of the catalyzer from decreasing so as to prevent an increase in the discharge of harmful gases. This condition is provided for executing the above control operation (7).

The condition CE6 is provided for indicating whether the driving mode is in the D range (i.e., drive mode) or the N range (i.e., neutral mode). A detailed explanation is omitted here, but in the present embodiment, the vehicle comprises a plurality of modes for determining the operational characteristics by changing the CVT control by an operation by the driver. The D range (i.e., drive mode) is used for ordinary driving, while the N range (i.e., neutral mode) is used when, for example, the vehicle is stopped for a long time. In addition to these ranges, the S range (i.e., sport mode) is also provided for (i) setting higher torque at the vehicle start in comparison with the other driving modes, so as to obtain a higher acceleration, (ii) setting a higher CVT ratio in the high-speed driving mode, or the like. The driving operability can be improved according to such controls.

The condition CE7 is provided for indicating whether the degree of depression of the accelerator pedal is zero, that is, whether the driver is not depressing the accelerator pedal. If the accelerator pedal is depressed, then it is determined that the driver currently would like to accelerate the vehicle and the engine 10 must be operated. However, if accelerator pedal is not depressed, then that is regarded as a condition for determining that the driver intends to stop the vehicle, which can be used as one of the conditions necessary for the idle stop.

The condition CE8 is provided for indicating that no operation request signal has been output from the air conditioner. That is, in the operation of the air conditioner under specific set conditions, to set the passenger compartment temperature to a designated temperature takes highest precedence. In this case, an operation request signal is output from the air conditioner ECU 21 to the engine ECU 18. If this signal is output, the engine 10 must be operated so as to operate the compressor; thus, the idle stop cannot be performed. This CE8 is one of the conditions for executing the above-explained control (7).

The condition CE9 is provided for showing whether the switches provided for the brake pedal are operating normally. If these switches are damaged, then the vehicle is probably being operated contrary to the driver's intention. Therefore, according to the engine speed, vehicle speed, or the like, it is determined whether the above switches are operating normally. CE9 is one of the conditions for executing the above-explained control (4).

The condition CE10 is provided for indicating whether the pulse signal showing the vehicle speed is being output normally. As explained above, a pulse generator is attached to wheels 14, which generates a pulse signal for each rotation of the wheels. The engine ECU 18 calculates the vehicle speed according to the intervals of pulse generation. The idle stop is also executed while the vehicle is stopped. Therefore, CE10 is defined for preventing an erroneous operation such that even when the vehicle is accelerated by a damaged pulse generator, engine ECU 18 determines that the vehicle is stopped and the idle stop is executed.

The condition CE11 is provided for indicating whether the brake pedal is depressed. The reason for providing CE11 is that the idle stop of the vehicle having CVT 13 is basically executed according to the determination of whether the brake pedal is depressed.

The condition CE12 is provided for indicating whether the CVT ECU 36 has output a signal which shows whether the preparation for executing the idle stop of the CVT 13 is completed. This signal is output if the CVT ratio has been returned to the low ratio, and whether the CVT ratio has been returned to the low ratio is determined by detecting the disengaged state of the start clutch provided for the CVT. As explained above, the idle stop is executed after the ratio of CVT 13 is returned to a low ratio because in the other cases, sufficient acceleration may not be obtained when the vehicle starts.

The condition CE13 is provided for indicating whether the brake-master-power negative pressure is equal to or larger than a predetermined value based on the gauge pressure. An example of the negative pressure is −250 mmHg. This condition is provided for executing the above control operation (8).

The condition CE14 is provided for indicating whether the vehicle speed has reached or exceeded a predetermined value (e.g., 15 km/h) after the engine has restarted.

Below, with reference to FIG. 3B, the conditions necessary for restarting the engine will be explained.

As shown in FIG. 3B, conditions CF3 and CF4 are logically connected via AND operator OP52, conditions CF5 and CF6 are logically connected via AND operator OP53, and conditions CF7 to CF10 are logically connected via OR operator OP55. In addition, the output terminal of AND operator OP53 and the output terminal of OR operator OP55 are logically connected via AND operator OP54, and condition CF2, the output terminal of AND operator OP52, the output terminal of AND operator OP54, and condition CF11 are logically connected via OR operator OP51. Lastly, condition CF1 and the output terminal of OR operator OP51 are logically connected via AND operator OP50. In addition, a signal for restarting the engine is output from the output terminal of AND operator OP50.

The condition CF1 is provided for indicating whether the idle stop is currently being executed. This is a necessary condition because the engine restart is an operation for restarting the engine from the idle stop state.

The condition CF2 is provided for indicating that the driver is not currently depressing the brake pedal, while the condition CF3 is provided for indicating that the driver is currently depressing the brake pedal. These conditions are provided because in the idle stopping control of a vehicle having CVT 13, basically, the idle stop is executed when the driver depresses the brake pedal, and the engine is restarted when the driver releases the brake pedal.

The condition CF4 is provided for indicating whether the state of CVT 13 is one of the R in-gear (i.e., reverse) state, P in-gear (i.e., parking) state, S in-gear (i.e., second gear) state, and L in-gear (i.e., low gear) state. As known, in CVTs, step-like gear changes are not performed as for a manual transmission or the like, but a continuous shift according to the vehicle speed or the like is performed. Here, the CVT ratio may be set according to the driver's intention, and whether the driver sets the CVT 13 to one of the above states is one of the conditions for restarting the engine.

The condition CF5 is provided for indicating whether the brake pedal is being depressed, and the condition CF6 is provided for indicating whether the gear is currently in a neutral state.

The condition CF7 is provided for indicating whether the accelerator pedal is in the depressed state. The condition CF8 is provided for indicating whether the vehicle speed has reached or exceeded a predetermined value after the stopping. An example of the predetermined vehicle speed is 3 km/h.

The condition CF9 is provided for indicating whether the state of charge (i.e., remaining charge) is a predetermined value or less, for example, 25% or less. If the idle stop is continued in a state of low charge, the power of the second battery 30 is consumed by the electric load 29 in FIG. 2, so that power is supplied to the second battery 30 via downverter 28 from the first battery 26 so as to maintain the remaining charge of the second battery 30. If such an operation is continuously performed over a long time, the state of charge of the first battery 26 is decreased and it may not be possible to execute the operation for restarting engine 10. In order to prevent such a situation, a predetermined decrease of the battery state of charge is used as one of the conditions for restarting the engine. This condition is one of the conditions for executing the above-explained control (4).

Below, with reference to FIG. 4, the state of charge of the battery at the engine restart will be explained.

Figure 4:
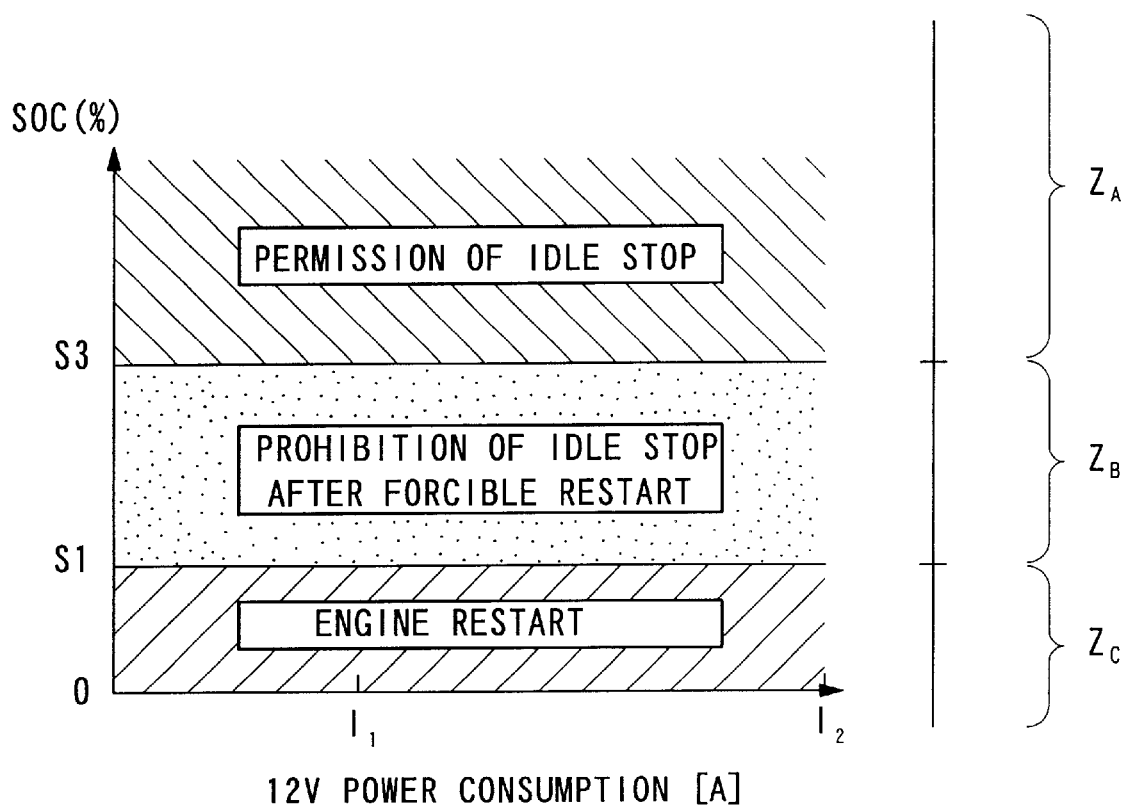
FIG. 4 is a diagram for explaining the relationship between the engine restart and the state of charge of the battery.

FIG. 4 is a diagram for explaining the relationship between the engine restart and the state of charge of the battery. As shown in the figure, three kinds of control areas are defined according to the state of charge.

In the area indicated by reference symbol $Z_C$, the engine is forcibly restarted because the state of charge is low.

In the area indicated by reference symbol $Z_B$, the engine is forcibly restarted, and even after the first battery 26 is charged and the engine is not forcibly restarted, the idle stop control is prohibited. That is, in this area, the engine is forcibly restarted, and if the idle stop is executed even after the battery is charged to reach the state of charge higher than S1 (see FIG. 4), the time from the idle stop to the restart of the engine is probably short; thus, the idle stop and engine restart operations are frequently repeated. Therefore, the operability may be degraded, and thus the idle stop is prohibited.

In the area indicated by reference symbol $Z_A$, even if the engine is forcibly restarted, the idle stop is permitted. In this area, the state of charge is large. Therefore, even if the idle stop is executed, frequent repetition of the engine stopping and restarting operations may probably be prevented; thus, the idle stop is permitted.

The condition CF10 is provided for indicating whether the air conditioner has issued an engine restart request. This condition is one of the conditions for executing the control (4), that is, a control for maintaining the comfort of the vehicle.

The condition CF11 is provided for indicating whether the brake-master-power negative pressure is equal to or above a predetermined value based on the gauge pressure while the brake pedal is depressed. An example of the negative pressure is −250 mmHg. This condition is one of the conditions for executing the above-explained control (8).

Above, the conditions for determining whether the idle stop is executed, and the conditions for determining whether the engine restart is executed have been respectively explained.

Below, the control flow to which the idle stop and engine restart conditions (as shown in FIGS. 3A and 3B) are actually applied will be explained.

Figure 5:
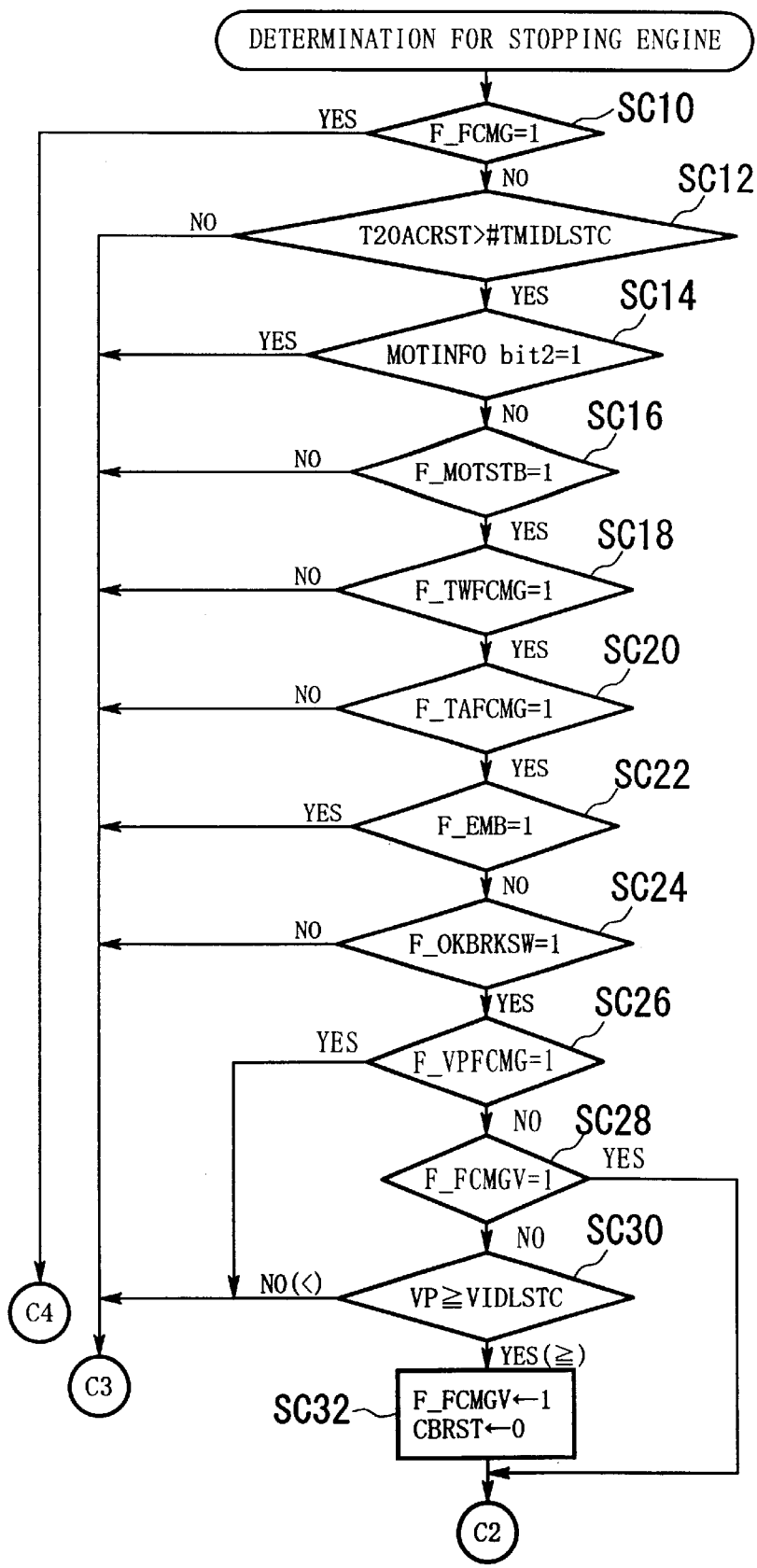
FIGS. 5 and 6 show a flowchart showing the operation for determining whether the idle stop is executed in the embodiment shown in FIG. 2.
Figure 6:
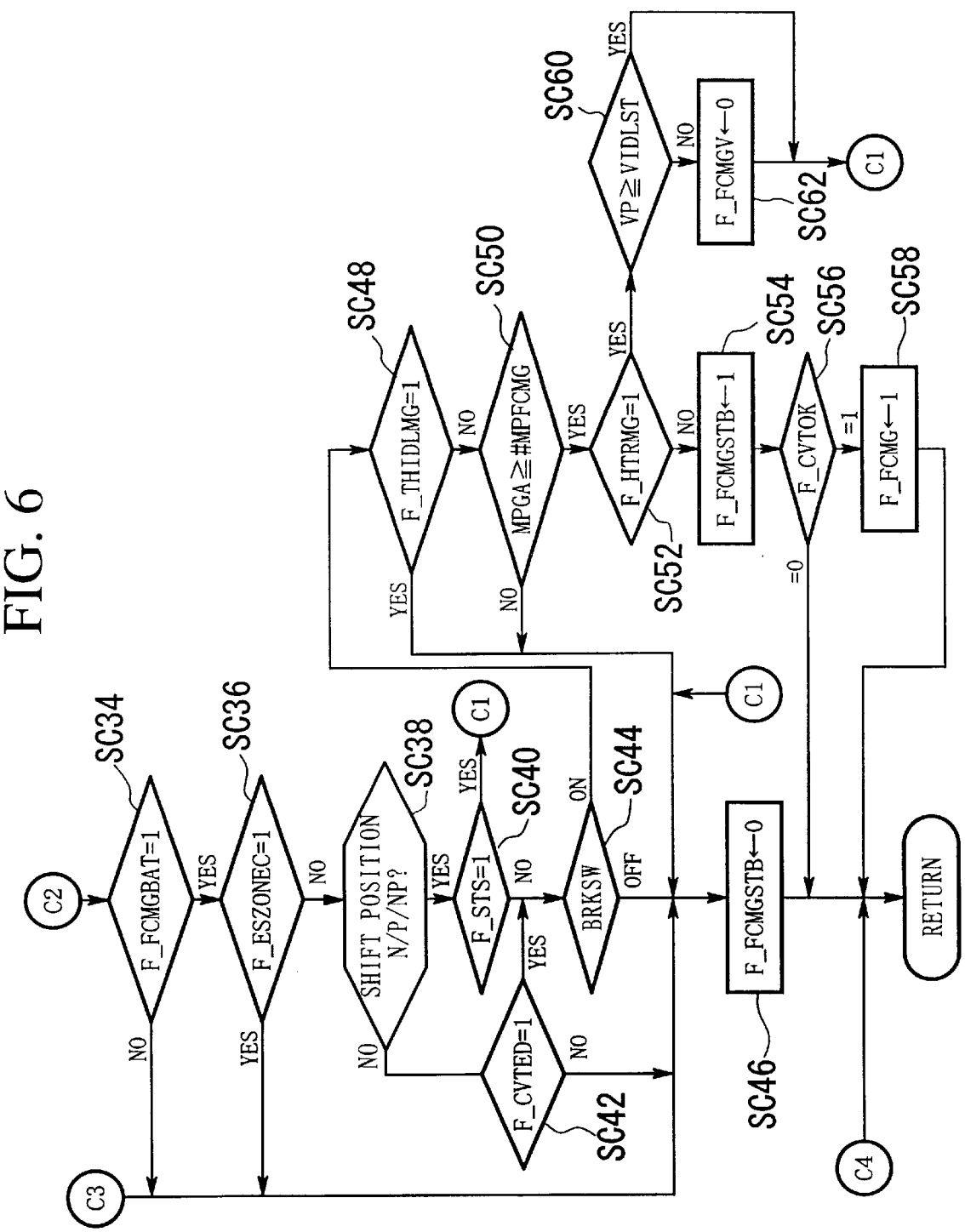

FIGS. 5 and 6 show a flowchart of the operation of determining whether the idle stop (as an embodiment of the present invention) is executed. The operation shown in the flowcharts of FIGS. 5 and 6 is performed by calling from the main routine (not shown) at predetermined intervals (e.g., 10 msec). The engine ECU 18 in FIG. 2 performs this operation. Whether the idle stop is executed is determined by using flag F_FCMG (see FIGS. 5 and 6) which is set to 1 if the idle stop is executed. That is, if the value of flag F_FCMG is 1, then the idle stop control is executed when the operation is returned to the main routine. On the contrary, if the value of flag F_FCMG is 0, then the idle stop control is not executed. Here, the initial value of flag F_FCMG is 0.

When the operation shown in FIG. 5 is called from the main routine and the relevant operation is started, in step SC10, it is determined whether the value of flag F_FCMG is 1. In the operation shown in FIGS. 5 and 6, the value of flag F_FCMG is set to 1 so as to execute the idle stop, as explained above. Therefore, if the value of flag F_FCMG has already been set to 1, then the following steps are meaningless. Accordingly, if the result of the determination of step SC10 is "YES", then the operation returns to the main routine. On the other hand, if the determination result of step SC10 is "NO", then the operation proceeds to step SC12.

In step SC12, it is determined whether a predetermined time has elapsed after the starter switch is switched on. The variable #TMIDLSTC in step SC12 is set to 120 sec (i.e., 2 minutes) as the above predetermined time, and this value is compared with the value of timer T20ACRST so that it is determined whether the predetermined time has elapsed. Here, the timer T20ACRST is a timer whose counting starts after the starter switch is switched on.

If the result of the determination in step SC12 is "NO", then the operation jumps to step SC46, where the value of flag F_FCMGSTB is set to 0. Then, the operation returns to the main routine. Here, the flag F_FCMGSTB indicates whether the engine ECU 18 has output an idle stop request signal (i.e., a signal requesting the idle stop) to CVT ECU 36. That is, if the value of flag F_FCMGSTB is 1, then it means that the engine ECU 18 has output an idle stop request signal to CVT ECU 36.

If the result of the determination in step SC12 is "YES", that is, if it is determined that the predetermined time has elapsed (set by using variable #TMIDLSTC) after the starter switch has been switched on, then the operation proceeds to step SC14.

In step SC14, it is determined whether the second bit of variable MOTINFO is 1. This second bit of variable MOTINFO indicates whether the temperature of the first battery 26 is 0 C. or less, and is set by battery ECU 32 according to the temperature condition of the first battery 26. If the result of the determination is "YES", that is, if the temperature of the first battery 26 is 0° C. or less, then the operation jumps to step SC46, where the value of flag F_FCMGSTB, which indicates that the engine ECU 18 has output an idle stop request signal to CVT ECU 36, is set to 0. The operation is then returned to the main routine.

On the other hand, if the result of the determination in step SC14 is "NO", that is, if it is determined that the temperature of the first battery 26 is more than 0° C., then the operation proceeds to step SC16.

In step SC16, it is determined whether the value of flag F_MOTSTB is 1. Here, the flag F_MOTSTB indicates whether the vehicle can be started using motor/generator 16. The value of flag F_MOTSTB is set by motor ECU 22 according to the state of motor/generator 16. If the result of the determination of step SC16 is "NO", then the operation jumps to step SC46, where the value of flag F_FCMGSTB, which indicates that the engine ECU 18 has output an idle stop request signal to CVT ECU 36, is set to 0. The operation is then returned to the main routine.

If the result of the determination of step SC16 is "YES", then the operation proceeds to step SC 18.

In step SC18, it is determined whether the value of flag F_TWFCMG is 1. Here, the flag F_TWFCMG indicates whether the water temperature of the engine is sufficiently high for executing the idle stop. The value of flag F_TWFCMG is set by engine ECU 18. Here, whether the idle stop is executed or not is determined with reference to the water temperature of the engine and the outside air temperature. In the present embodiment, the outside air temperature is evaluated by measuring the engine intake air temperature after the vehicle is driven for a predetermined time, and the water temperature necessary for executing the idle stop is calculated by using the evaluated outside air temperature. The water temperature and the actual water temperature of the engine are compared so that the value of flag F_TWFCMG is set to 1 or 0.

If the result of the determination in step SC 18 is "NO", then the operation jumps to step SC46, where the value of flag F_FCMGSTB, which indicates that the engine ECU 18 has output an idle stop request signal to CVT ECU 36, is set to 0. The operation is then returned to the main routine.

If the result of the determination in step SC 18 is "YES", then the operation proceeds to step SC20, where it is determined whether the value of flag F_TAFCMG is 1. Here, the flag F_TAFCMG indicates whether the outside air temperature is not too low so as to execute the idle stop, and the value of flag F_TAFCMG is set by engine ECU 18. In the present embodiment, as explained above, the outside air temperature is evaluated by measuring the engine intake air temperature after the vehicle drives for a predetermined time. Based on the evaluated outside air temperature, the value of flag F_TAFCMG is set to 1 or 0.

If the result of the determination in step SC20 is "NO", then the operation jumps to step SC46, where the value of flag F_FCMGSTB, which indicates that the engine ECU 18 has output an idle stop request signal to CVT ECU 36, is set to 0. The operation is then returned to the main routine.

If the result of the determination in step SC20 is "YES", then the operation proceeds to step SC22, where it is determined whether the value of flag F_EMB is 1. Here, the flag F_EMB indicates whether an emergency brake operation has been carried out. If such an emergency brake operation has been carried out, then the value of flag F_EMB is 1. Here, whether an emergency brake operation has been carried out is determined by checking whether the deceleration at the time of depression of the brake pedal is larger than a predetermined threshold value. If the result of the determination in step SC22 is "YES", then the idle stop should be prohibited so as to return the ratio of CVT 13 to a low level. Therefore, the operation jumps to step SC46, where the value of flag F_FCMGSTB, which indicates that the engine ECU 18 has output an idle stop request signal to CVT ECU 36, is set to 0. The operation is then returned to the main routine.

If the result of the determination in step SC22 is "NO", then the operation proceeds to step SC24, where it is determined whether the value of flag F_OKBRKSW is 1. Here, the flag F_OKBRKSW indicates whether the ON/OFF state of the brake pedal has been detected. That is, in step SC24, it is determined whether the ON/OFF state of the switch attached to the brake pedal has been normally detected. If the determination result is "NO", then the operation jumps to step SC46, where the value of flag F_FCMGSTB, which indicates that the engine ECU18 has output an idle stop request signal to CVT ECU 36, is set to 0. The operation is then returned to the main routine.

If the result of the determination in step SC24 is "YES", then the operation proceeds to step SC26, where it is determined whether the value of flag F_VPFCMG is 1. This flag F_VPFCMG is set to 1 if an abnormal pulse signal is output from the pulse generator attached to wheel 14. For example, if 100 pulses are output per second during the driving and the number of output pulses becomes 0 in an instant, then an abnormal state is determined, so that the value of flag F_VPFCMG is set to 1. If the result of the determination in step SC26 is "YES", then the operation proceeds to the above-explained step SC46 and then returns to the main routine, while if the result of the determination in step SC26 is "NO", then the operation proceeds to step SC28.

In step SC28, it is determined whether the value of flag F_FCMGV is 1. Here, the value of flag F_FCMGV is set to 1 when the vehicle speed reaches a predetermined value for the first time. That is, this flag F_FCMGV indicates that the vehicle has been started once. The above predetermined value is, for example, 15 km/h. If the result of the determination in step SC28 is "NO", then the operation proceeds to step SC30. In step SC30, it is determined whether variable VP has a value equal to or above the value of variable VIDLSTC. Here, the variable VP is provided for storing the number of pulses output for a predetermined time from the above-explained pulse generator (attached to wheel 14). Accordingly, the variable VP indicates the vehicle speed. An example of the variable VP is 15 km/h.

If the result of the determination in step SC30 is "NO", then the operation jumps to step SC46, and then returns to the main routine. If the result of the determination in step SC30 is "YES", then the operation proceeds to step SC32, where the flag F_FCMGV, which indicates that the vehicle has been started once, is set to 1, and the value of variable CBRST is set to 0. Here, the variable CBRST is provided for storing the count value obtained by counting the number of times the operation of restarting the vehicle has been executed. Here, the restart of the vehicle is determined by checking whether the driver releases the brake pedal (i.e., the OFF state).

After the process of step SC32 is completed, the operation proceeds to step SC34. On the other hand, if it is determined in step SC28 that the value of flag F_FCMGV (which indicates that the vehicle has been started once) is 1, then steps SC30 and SC32 are skipped and step SC34 is executed.

In step SC34, it is determined whether the value of flag F_FCMGBAT is 1. This flag F_FCMGBAT is set to 1 if the state of charge of the first battery 26 is approximately 25% or more, and is set to 0 in the other states. This flag is set by the battery ECU 32. If the result of the determination in step SC34 is "NO", then the operation jumps to step SC46 and then returns to the main routine, while if the result of the determination is "YES", then the operation proceeds to step SC36.

In step SC36, it is determined whether the value of flag F_ESZONEC is 1. Here, the flag F_ESZONEC indicates that the state of charge of the first battery 26 is in the area $Z_B$ or $Z_C$ shown in FIG. 4, and that the idle stop is prohibited under the current conditions. This flag F_ESZONEC is set by battery ECU 32 in FIG. 2. If the result of the determination of this step is "YES", the idle stop is not executed, so that the operation jumps to step SC46 and then returns to the main routine.

On the other hand, if the result of the determination in step SC36 is "NO", and thus it is determined that the state of charge of the first battery 26 is sufficient for executing the idle stop, then the operation proceeds to step SC38.

In step SC38, it is determined whether the current shift position is one of the neutral (N), parking (P), and neutral parking (NP) states. If the result of the determination in step SC38 is "NO", then the operation proceeds to step SC42. In step SC42, it is determined whether the value of flag F_CVTED is 1. Here, the flag F_CVTED indicates that the current mode of the CVT 13 is the D range (i.e., drive mode), and this flag is set by the CVT ECU 36 in FIG. 2. If the result of the determination in step SC42 is "NO", the idle stop control is not executed, so that the operation jumps to step SC46 and then returns to the main routine.

If the result of the determination in step SC38 is "YES", then the operation proceeds to step SC40, where it is determined whether the value of flag F_STS is 1. Here, the flag F_STS indicates whether the starter switch has been turned on. If the determination result is "YES", the operation jumps to step SC46 and then returns to the main routine. On the other hand, if the result of the determination in step SC40 is "NO", then the operation proceeds to step SC44. In addition, if the result of the determination in step SC42 is "YES", that is, if the CVT 13 is in the D range (i.e., drive mode), the operation also proceeds to step SC44.

In step SC44, it is determined whether brake switch BRKSW is on (i.e., in the ON state) or off (i.e., in the OFF_state). If the brake switch BRKSW is in the OFF_state, the idle stop is not executed, so that the operation proceeds to step SC46 and then returns to the main routine. On the other hand, if it is determined in step SC44 that the brake switch BRKSW is in the ON state, then the operation proceeds to step SC48.

In step SC48, it is determined whether the value of flag F_THIDLMG is 1. Here, the flag F_THIDLMG is provided for storing the state of the accelerator pedal, where if the degree of opening is maximum (i.e., the pedal is fully depressed), the value of the flag is 1, while if the degree of opening is minimum (i.e., the pedal is not depressed), the value of the flag is 0. If the determination result is "YES", this means that the accelerator pedal is depressed, so that the operation proceeds to step SC46 and then returns to the main routine, so as to prohibit the idle stop. On the other hand, if the result of the determination in step SC48 is "NO", then the operation proceeds to step SC50.

In step SC50, it is determined whether the value of variable MPGA is equal to or above the value of variable #MPFCMG. Here, the variable MPGA is provided for storing a value indicating the master-power negative pressure of the assistor, while the variable #MPFCMG is provided for storing a value for performing the engine restarting operation when the master-power negative pressure is reduced. If the determination result is "NO", then the operation jumps to step SC46 and then returns to the main routine, so as to prohibit the idle stop. On the other hand, if the result of the determination in step SC50 is "YES", then the operation proceeds to step SC52.

In step SC52, it is determined whether the value of flag F_HTRMG is 1. This flag F_HTRMG is provided for storing data, output from the air conditioner, for prohibiting the idle stop, where the value thereof is 1 when the idle stop is prohibited, while the value thereof is 0 when the idle stop is permitted. If the determination result is "NO", then the operation proceeds to step SC54.

In step SC54, the value of flag F_FCMGSTB is set to 1, where the flag F_FCMGSTB is provided for indicating whether the engine ECU has output a signal for requesting the idle stop to CVT ECU 36. When the operation of step SC54 is completed, it is determined in step SC56 whether the value of flag F_CVTOK is 1 or 0, where the flag F_CVTOK is provided for indicating whether the CVT ECU 36 has output the signal indicating the completion of CVT preparation to engine ECU18.

If the result of the determination in step SC56 is 0, the CVT preparation for executing the idle stop has not yet been completed; thus, the operation returns to the main routine. On the other hand, if the result of the determination in step SC56 is 1, the preparation of CVT 13 for executing the idle stop has already been completed; thus, the value of flag F_FCMG is set to 1 (see step SC58), and the operation returns to the main routine, and the idle stop control is executed.

If the result of the determination in step SC52 is "YES", that is, if the air conditioner has output a signal for indicating the prohibition of the idle stop, the operation proceeds to step SC60. In step SC60, it is determined whether the value of the variable VP, which indicates the vehicle speed, is equal to or above the value of variable #VIDLST (for example, 15 km/h). If the determination result is "YES", then the operation jumps to step SC46 and then returns to the main routine.

On the other hand, if the result of the determination in step SC60 is "NO", then the operation proceeds to step SC62, where the value of flag F_FCMGV is set to 0. The flag F_FCMGV indicates that the vehicle has been started once. The operation then jumps to step SC46 and then returns to the main routine. If the value of the above flag F_FCMGV is 0, the process of step SC58 is not executed in the flow shown in FIGS. 5 and 6, and the idle stop is not executed. Accordingly, the processes of steps SC60 and SC62 are provided for prohibiting the idle stop when the vehicle speed is low.

The above is an explanation of the flowchart of the operation for determining whether the idle stop is executed.

Below, the operation for determining whether the restart of engine 10 is executed in the idle stop mode will be explained in detail.

Figure 7:
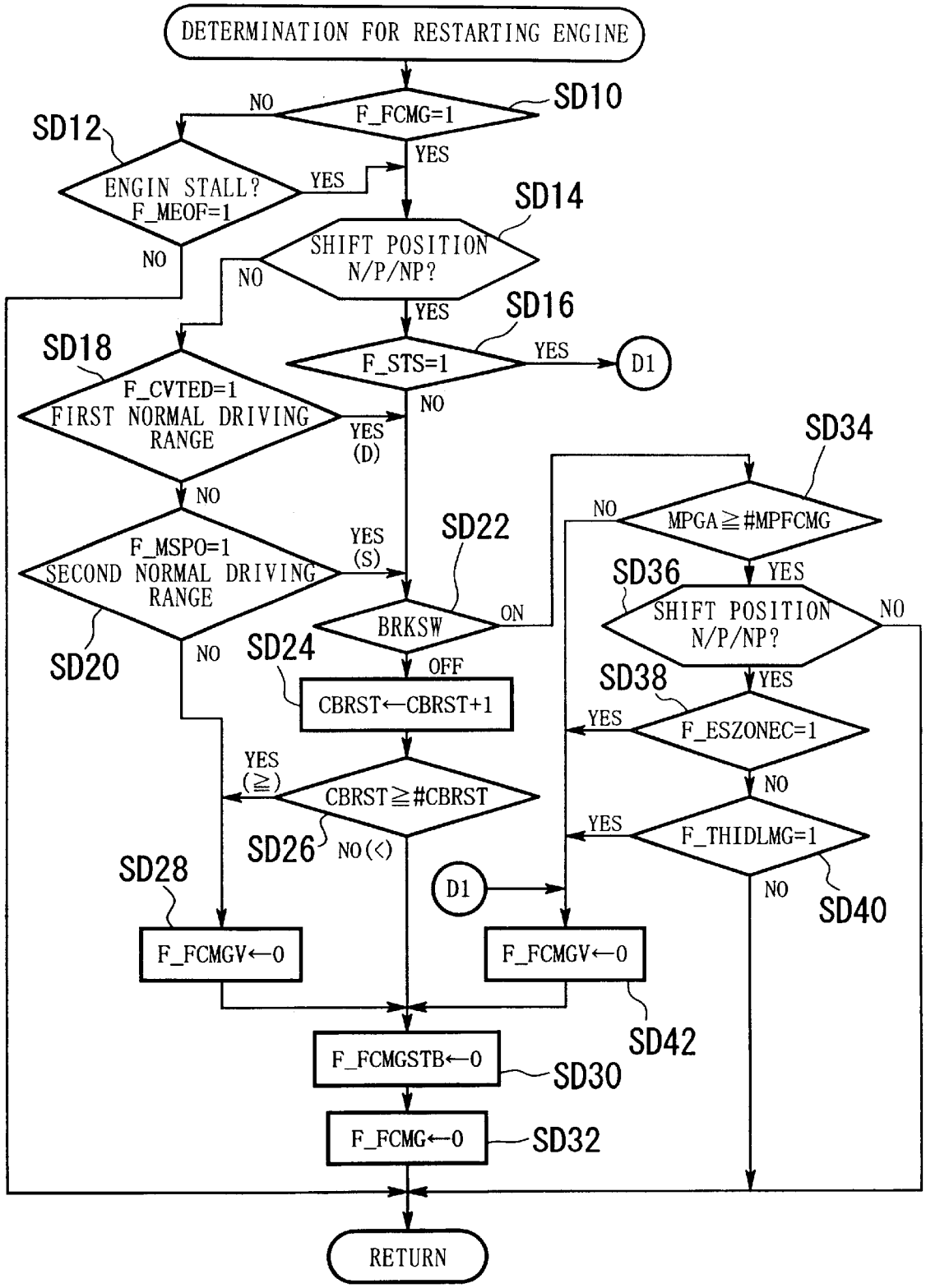
FIG. 7 shows a flowchart showing the operation for determining whether the engine is restarted in the embodiment shown in FIG. 2.

FIG. 7 is a flowchart showing the operation for determining whether the restart of engine 10 is executed in the present embodiment. The operation shown in FIG. 7 is called from the main routine (not shown) at specific intervals (e.g., 10 msec) and is executed by engine ECU 18 in FIG. 2. Here, whether the engine is restarted or not is determined according to whether the value of flag F_FCMG (refer to FIG. 7) is set to 0. In the operation flow shown in FIGS. 5 and 6, the value of flag F_FCMG is set to 1 so as to execute the idle stop, while in the operation flow shown in FIG. 7, the value of flag F_FCMG, which was set to 1, is set to 0 so as to restart the engine.

When the operation shown in FIG. 7 is called from the main routine and is started, it is determined in step SD10 whether the value of flag F_FCMG is 1. This process is provided for omitting an unnecessary operation if the value of flag F_FCMG has already been set to 0 when the process for setting the value of this flag from 1 to 0 is started. If the result of the determination in step SD10 is "NO", then the operation proceeds to step SD12.

In step SD12, it is determined whether the value of flag F_MEOF is 1. Here, the flag F_MEOF is set to 1 if the engine rotation speed is 0. That is, this process is provided for determining whether the engine is stalled. That is, if the value of flag F_FCMG is 0, it means that the idle stop is prohibited, and the engine is operated. Therefore, the operation is returned to the main routine (if the result of the determination in step SD12 is "NO").

However, in step SD12, if the idle stop is prohibited and the value of flag F_MEOF (which indicates that the engine rotation speed is 0) is 0, then it is determined that the engine is stalled, that is, the result of the determination in step SD12 is "YES". In this case, the operation proceeds to step SD14 so as to restart the engine. Here, the situation that the engine speed becomes 0 while the idle stop is prohibited occurs when a careless operation, such as the driver trying to stop the vehicle in the in-gear state is performed.

In step SD14, it is determined whether the shift position is one of the neutral (N), parking (P), and neutral parking (NP) states. If the result of the determination in step SD14 is "NO", then the operation proceeds to step SD18. Instep SD18, it is determined whether the value of flag F_CVTED is 1, where the flag F_CVTED is provided for indicating whether the CVT 13 is currently in the D range (i.e., drive mode). If the determination result is "NO", that is, if it is determined that the current mode of CVT 13 is not the D range (i.e., drive mode), then the operation proceeds to step SD20, where it is determined whether the value of flag F_MSPO is 1. Here, the flag F_MSPO is provided for indicating whether the driving mode is the S range (i.e., sport mode), and the value of this flag is 1 when the current mode is the S range.

If the result of the determination in step SD20 is "NO", then the operation proceeds to step SD28. In the step SD28, the value of flag F_FCMGV, which indicates that the vehicle started once, is set to 0. When the process of step SD28 is completed, then in step SD30, the value of flag F_FCMGSTB, which indicates that the engine ECU has output to the CVT ECU 36 a signal for requesting the idle stop, is set to 0, and the signal for releasing the idle stop is output to the CVT ECU 36. When the process of step SD30 is completed, the operation then proceeds to step SD32, where the value of flag F_FCMG is set to 0. The operation is then returned to the main routine, and the engine is restarted because the value of flag F_FCMG is 0.

On the other hand, if the result of the determination in step SD14 is "YES", that is, if the relevant shift position is one of the neutral (N), parking (P), and neutral parking (NP)

states, then the operation proceeds to step SD16. In step SDI6, it is determined whether the value of flag F_STS is 1, where the flag F_STS indicates that the starter switch has been set to the ON state. If the determination result is "YES", then the operation jumps to step SD42. In step SD42, the value of flag F_FCMGV for indicating that the vehicle has been started once is set to 0. When the process of step SD42 is completed, then in step SD30, the value of flag F_FCMGSTB, which indicates whether the engine ECU18 has output a signal for requesting the idle stop to the CVT ECU 36, is set to 0, and the signal for releasing the idle stop is output to the CVT ECU 36. Next, in step SD32, the value of flag F_FCMG is set to 0, and then the operation is returned to the main routine. Here, the value of flag F_FCMG is currently 0; thus, the engine is restarted.

On the other hand, if the result of the determination in step SD16 is "NO", that is, if it is determined that the starter switch has not yet been turned on, then the operation proceeds to step SD22. In addition, (i) if the result of the determination in step SD18 is "YES", that is, if it is determined that the driving mode is the D range (i.e., drive mode), or (ii) if the result of the determination in step SD20 is "YES", that is, if it is determined that the driving mode is the S range (i.e., sport mode), then the operation also proceeds to step SD22.

Below, the reason why the operation proceeds from step SD20 to step SD22 will be explained. Here, it is assumed that step SD20 is omitted. In this case, if the result of the determination in step SD 18 is "NO", then the engine restarting operation is executed via steps SD28 to SD32. Therefore, if the driving mode is set to the S range (i.e., sport mode), then the results of determinations in steps SD14 and SD18 are both "NO"; thus, the engine is restarted. That is, the engine is restarted when the driver shifts the driving mode from the D range (the drive mode) to the S range (the sport mode). As explained above, the idle stop and engine restart controls of a vehicle comprising CVT 13 are basically executed by an operation by the driver such as depressing the brake pedal or releasing the brake pedal while predetermined driving conditions are satisfied. Therefore, it is undesirable to execute the engine restart control by switching the driving mode. Accordingly, step SD20 is provided, and thus he operation from step SD20 to SD 22 is executed for determining whether the brake pedal has been depressed.

In step SD22, it is determined whether the driver has depressed the brake pedal and the brake switch BRKSW has been turned on. If it is determined that the brake pedal is not being depressed, then the operation proceeds to step SD24, where the value of variable CBRST is increased by 1. Here, the variable CBRST is provided for storing the count value which indicates the execution number of the operation of restarting the vehicle. The restart of the vehicle is determined by checking whether the driver has released the brake pedal and thus the relevant switch has been turned off.

When the process of step SD24 has been completed, the operation proceeds to step SD26. In the step SD26, it is determined whether the value of variable CBRST for storing the execution number of the vehicle restarting operation is equal to or above the value of variable #CBRST. Here, the variable #CBRST has been set to, for example, 2. If the result of the determination in step SD26 is "YES", then the operation proceeds to step SD28, where the value of flag F_FCMGV is set to 0. That is, if the number of times the vehicle restarting operation is executed is equal to or above a predetermined number, then the value of flag F_FCMGV (which indicates that the vehicle has been started once) is set to 0. Therefore, the idle stop is prohibited until the vehicle speed exceeds a predetermined speed (e.g., 15 km/h). The operation then returns to the main routine via steps SD30 and SD32, so that the engine is restarted.

On the other hand, if the result of the determination in step SD26 is "NO", then the operation proceeds to step SD30. This process is provided for permitting the idle stop after the engine restart because the (repetition) number of times the engine restarting operation has been executed has not yet reached the predetermined number. When the processes of steps SD30 and SD32 are completed, then the operation returns to the main routine and the engine is restarted.

If it is determined in step SD22 that the driver currently depresses the brake pedal, then the operation proceeds to step SD34. In the step SD34, it is determined whether the value of variable MPGA for storing the value which indicates the master-power negative pressure of the assistor is equal to or above the value of variable #MPFCMG. If the determination result is "NO", this means that the master-power negative pressure is small. Therefore, the operation is returned to the main routine via steps SD42, SD30, and SD32, and the engine is restarted so as to increase the master-power negative pressure.

On the other hand, if the result of the determination in step SD34 is "YES", that is, if the master-power negative pressure is high, then the operation proceeds to step SD36, where it is determined whether the current shift position is one of the neutral (N), parking (P), and neutral parking (NP) states. If the determination result is "NO", then the operation returns to the main routine and the idle stop control is continued. On the other hand, if the result of the determination in step SD36 is "YES", then the operation proceeds to step SD38.

In step SD38, it is determined whether the value of flag F_ESZONEC is 1. That is, if the shift position is one of the neutral (N), parking (P), and neutral parking (NP) states and the state of charge of the first battery 26 is low (that is, if the result of the determination in step SD38 is "YES"), then the engine should be forcibly restarted, so that the operation is returned to the main routine via steps SD42, SD30, and SD32 and the engine is restarted. On the other hand, if the result of the determination in step SD38 is "NO", then the operation proceeds to step SD40.

In step SD40, it is determined whether the value of flag F_THIDLMG for storing the data which indicates the state of the accelerator pedal is 1. If the determination result is "YES", then the processes of steps SD42, SD30, and SD32 are executed and then the operation returns to the main routine, so that the engine is restarted. In this case, the driver has depressed the brake pedal and also depressed the accelerator pedal; thus, the engine is restarted. On the other hand, if the result of the determination in step SD40 is "NO", then the operation returns to the main routine and the idle stop is continued.

An embodiment of the present invention has been explained above; however, the present invention is not limited to the above embodiment and any modification is possible within the scope and spirit of the present invention. For example, a hybrid vehicle is employed in the above embodiment; however, the present invention can obviously be applied to an ordinary vehicle which does not comprise a motor for assisting the engine operation. Also in the present embodiment, the outside air temperature is evaluated by using the engine intake air temperature after the vehicle is driven for a specific time. However, this process is omitted if a temperature sensor for measuring the outside air temperature is provided.

What is claimed is:

1. An engine control system for automatically stopping/starting an engine according to conditions of a vehicle, the system comprising an engine start/stop control device and an automatic transmission, wherein:

the automatic transmission, having driving modes of a first normal driving range and a second normal driving range different from the first normal driving range, comprises:

a driving mode switch detecting section for detecting a switch of the driving mode from the first normal driving range to the second normal driving range;

an automatic stop detecting section for detecting whether the engine is currently in a stopped state due to an automatic stop operation; and a brake state detecting section for detecting whether a brake for stopping the vehicle is currently being operated, and the engine start/stop control device comprises:

a control section for automatically starting the engine if it is determined by the automatic stop detecting section that the engine is currently in a stopped state due to the automatic stop operation, and if it is determined by the driving mode switch detecting section that the driving mode has been switched to the second normal driving range, and if it is determined by the brake state detecting section that the brake is not currently being operated.

2. An engine control system as claimed in claim 1, wherein the engine is automatically stopped while the idling operation is performed.

3. An engine control method for automatically stopping/starting an engine according to conditions of a vehicle, comprising the steps of:

detecting a switch of the driving mode of the vehicle from a first normal driving range to a second normal driving range different from the first normal driving range;

detecting whether the engine is currently in a stopped state due to an automatic stop operation;

detecting whether a brake for stopping the vehicle is currently being operated; and automatically starting the engine if it is determined that the engine is currently in a stopped state due to the automatic stop operation, and that the driving mode has been switched to the second normal driving range, and that the brake is not currently being operated.

4. An engine control method as claimed in claim 3, wherein the engine is automatically stopped while the idling operation is performed.

\* \* \* \* \*